US012641136B2

(12) United States Patent
Sangameshwara et al.

(10) Patent No.: US 12,641,136 B2
(45) Date of Patent: \*May 26, 2026

(54) METHOD FOR SHARING A RECORDING STATUS INSIDE A MISSION CRITICAL VIDEO GROUP CALL

(71) Applicant: Samsung Electronics Co., Ltd., Gyeonggi-do (KR)

(72) Inventors: Vijay Sangameshwara, Bangalore (IN); Kiran Gurudev Kapale, Bangalore (IN); Paarisha Narula, Bangalore (IN); Siva Prasad Gundur, Bangalore (IN)

(73) Assignee: Samsung Electronics Co., Ltd (KR)

( * ) Notice: Subject to any disclaimer, the term of this patent is extended or adjusted under 35 U.S.C. 154(b) by 15 days.

This patent is subject to a terminal disclaimer.

(21) Appl. No.: 18/758,568

(22) Filed: Jun. 28, 2024

(65) Prior Publication Data

US 2024/0356998 A1 Oct. 24, 2024

Related U.S. Application Data

(63) Continuation of application No. 18/020,795, filed as application No. PCT/KR2021/010764 on Aug. 12, 2021, now Pat. No. 12,052,304.

(30) Foreign Application Priority Data

Aug. 12, 2020 (IN) .............................. 202041034738
Aug. 4, 2021 (IN) .............................. 202041034738

(51) Int. Cl.
*H04L 65/613* (2022.01)
*H04L 65/1089* (2022.01)
*H04W 76/40* (2018.01)
(52) U.S. Cl.
CPC ........ *H04L 65/613* (2022.05); *H04L 65/1089* (2013.01); *H04W 76/40* (2018.02)

(58) Field of Classification Search
CPC ... H04L 65/613; H04L 65/1089; H04W 76/40
See application file for complete search history.

(56) References Cited

U.S. PATENT DOCUMENTS 7,567,662 B1    7/2009  Renner
8,997,167 B1    3/2015  Bliss
(Continued)

FOREIGN PATENT DOCUMENTS

WO    WO 2018/062940    4/2018

OTHER PUBLICATIONS

PCT/ISA/210 Search Report issued on PCT/KR2021/010764, Nov. 30, 2021, pp. 4.

(Continued)

*Primary Examiner* — Viet D Vu
(74) *Attorney, Agent, or Firm* — The Farrell Law Firm, P.C.

(57) ABSTRACT

The disclosure relates to a communication method and system for converging a 5th-Generation (5G) communication system for supporting higher data rates beyond a 4th-Generation (4G) system with a technology for Internet of Things (IoT). In an embodiment, a method performed by a user equipment (UE) in a wireless communication system is provided, which includes receiving, from a mission critical video (MCVideo) server, a live video stream in an MCVideo group call; recording the live video stream received from the MCVideo server; and transmitting, to the MCVideo server, a transmission control message including a record media status message for indicating that the live video stream is being recorded while participating in the MCVideo group call. The UE is at least one among a plurality of UEs participating in the MCVideo group call.

18 Claims, 9 Drawing Sheets

(56)     References Cited

U.S. PATENT DOCUMENTS

| 10,284,605 | B2 | 5/2019 | Baek et al. |
| 2009/0222875 | A1 | 9/2009 | Cheng |
| 2016/0165184 | A1* | 6/2016 | Aaron ................. H04L 12/1822 |
| | | | 348/14.08 |
| 2016/0373699 | A1 | 12/2016 | Torres |
| 2017/0111421 | A1 | 4/2017 | Schmidt |
| 2018/0192003 | A1 | 7/2018 | Gero et al. |
| 2019/0273773 | A1 | 9/2019 | Pattan et al. |
| 2020/0099789 | A1 | 3/2020 | Miller |
| 2020/0120454 | A1 | 4/2020 | Gundur et al. |
| 2020/0153838 | A1 | 5/2020 | Ge |

OTHER PUBLICATIONS

PCT/ISA/237 Written Opinion issued on PCT/KR2021/010764, Nov. 30, 2021, pp. 4.
Indian Examination Report dated Jun. 16, 2022, issued in counterpart application No. IN 202041034738, pp. 5.
3GPP TS 24.581 V15.5.0, 3rd Generation Partnership Project; Technical Specification Group Core Network and Terminals; Mission Critical Video (MCVideo) Media Plane Control; Protocol Specification (Release 15), Jun. 2020, 206 pages.
3GPP TS 23.281 V14.7.0, 3rd Generation Partnership Project; Technical Specification Group Services and System Aspects; Functional Architecture and Information Flows to Support Mission Critical Video (MCVideo); Stage 2 (Release 14), Dec. 2018, 163 pages.
International Search Report dated Nov. 30, 2021 issued in counterpart application No. PCT/KR2021/010764, 8 pages.

* cited by examiner

ONE OR MORE UE

| PROCESSOR | ~ 302 |

| MEMORY | ~ 304 |

| DATA | ~ 306 |

| MODULE (s) | ~ 308 |

| IMAGINE ENGINE | ~ 310 |

| TRANSCEIVER | ~ 312 |

<u>400</u>

~204

MCVIDEO SERVER

PROCESSOR — 402

MEMORY — 404

DATA — 406

MODULE (s) — 408

TRANSCEIVER — 410

500

206b

AT LEAST ONE UE

PROCESSOR — 502

MEMORY — 504

DATA — 506

MODULE (s) — 508

RECORDING UNIT — 510

TRANSCEIVER — 512

Figure 7:
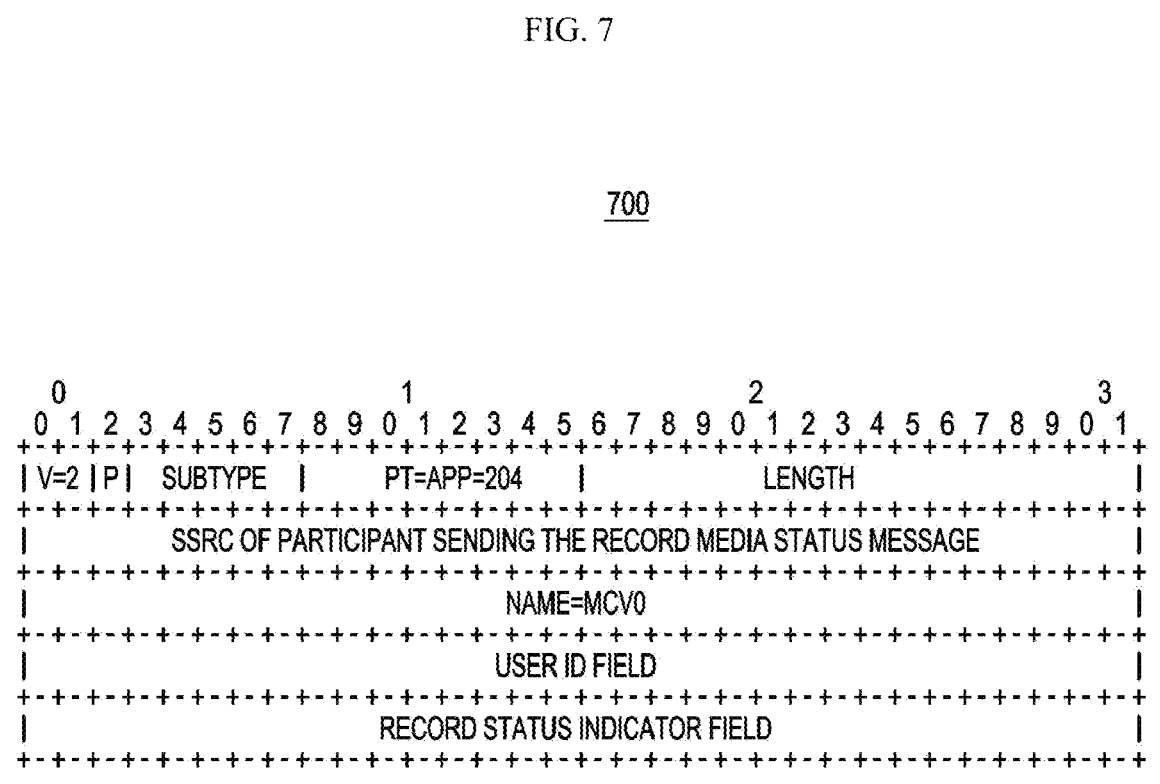

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V=2 |P|  SUBTYPE  |    PT=APP=204     |            LENGTH             |
+-+-+-+-+-+-+-+-+-+-+-+-+-+-+-+-+-+-+-+-+-+-+-+-+-+-+-+-+-+-+-+-+
|        SSRC OF PARTICIPANT SENDING THE RECORD MEDIA STATUS MESSAGE        |
+-+-+-+-+-+-+-+-+-+-+-+-+-+-+-+-+-+-+-+-+-+-+-+-+-+-+-+-+-+-+-+-+
|                              NAME=MCV0                              |
+-+-+-+-+-+-+-+-+-+-+-+-+-+-+-+-+-+-+-+-+-+-+-+-+-+-+-+-+-+-+-+-+
|                             USER ID FIELD                             |
+-+-+-+-+-+-+-+-+-+-+-+-+-+-+-+-+-+-+-+-+-+-+-+-+-+-+-+-+-+-+-+-+
|                     RECORD STATUS INDICATOR FIELD                     |
+-+-+-+-+-+-+-+-+-+-+-+-+-+-+-+-+-+-+-+-+-+-+-+-+-+-+-+-+-+-+-+-+
```

Figure 8:
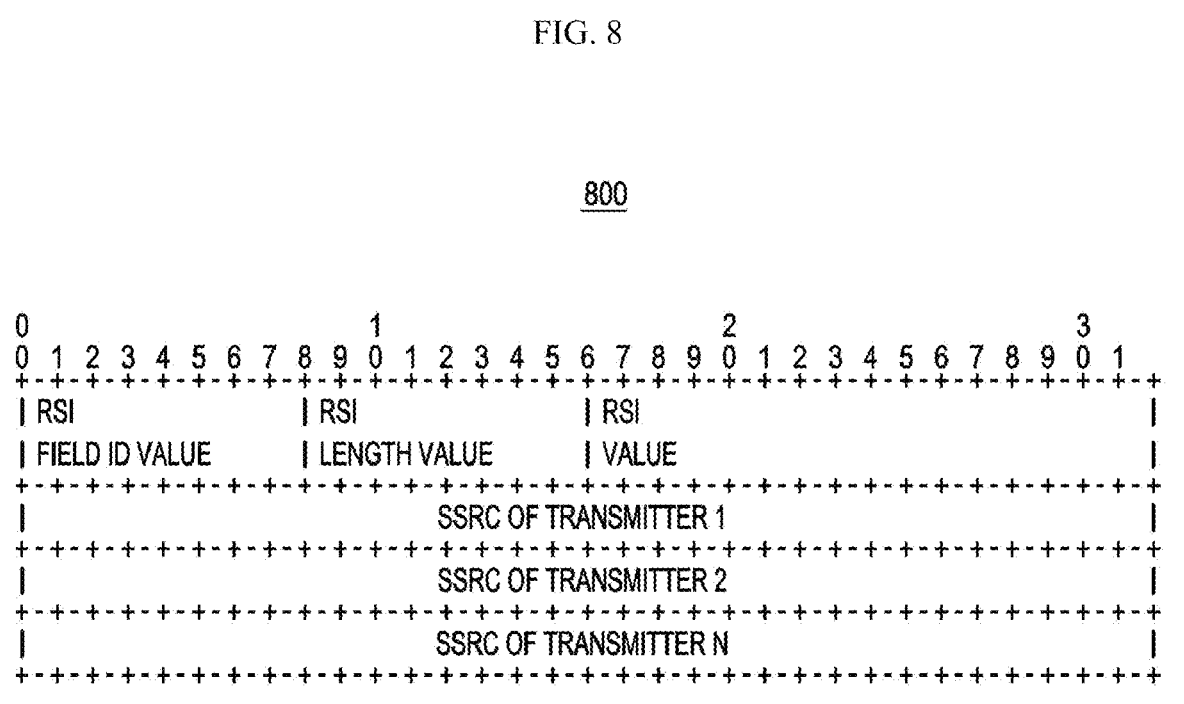

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| RSI            | RSI            | RSI                          |
| FIELD ID VALUE | LENGTH VALUE   | VALUE                        |
+-+-+-+-+-+-+-+-+-+-+-+-+-+-+-+-+-+-+-+-+-+-+-+-+-+-+-+-+-+-+-+-+
|                   SSRC OF TRANSMITTER 1                        |
+-+-+-+-+-+-+-+-+-+-+-+-+-+-+-+-+-+-+-+-+-+-+-+-+-+-+-+-+-+-+-+-+
|                   SSRC OF TRANSMITTER 2                        |
+-+-+-+-+-+-+-+-+-+-+-+-+-+-+-+-+-+-+-+-+-+-+-+-+-+-+-+-+-+-+-+-+
|                   SSRC OF TRANSMITTER N                        |
+-+-+-+-+-+-+-+-+-+-+-+-+-+-+-+-+-+-+-+-+-+-+-+-+-+-+-+-+-+-+-+-+
```

Figure 9:
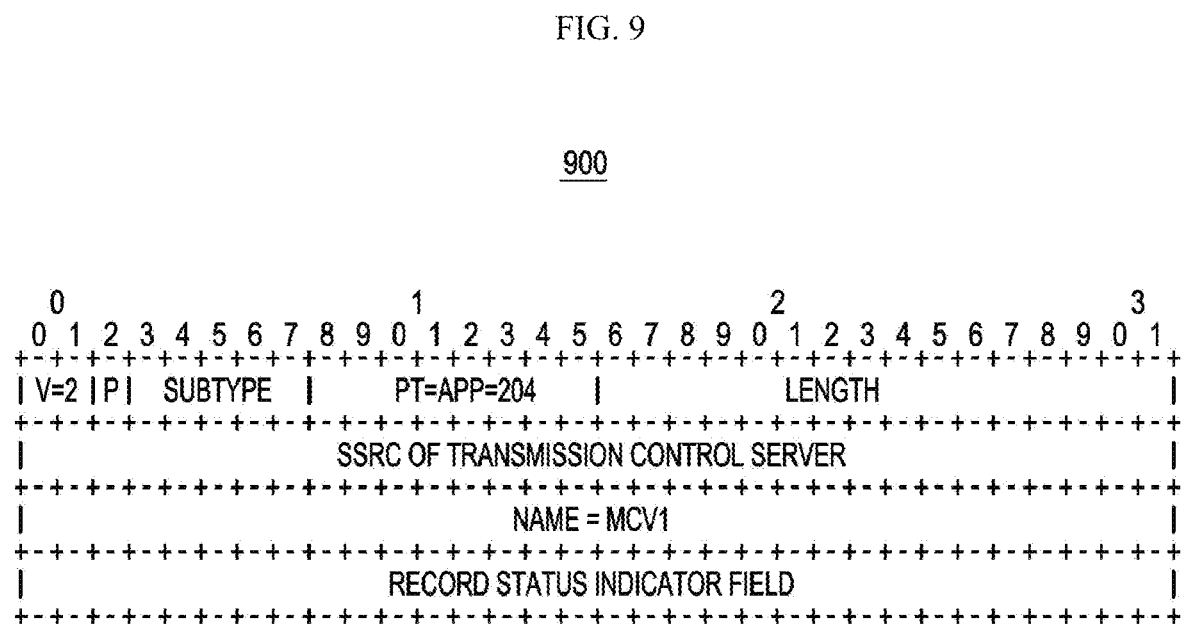

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| V=2 |P|  SUBTYPE  |     PT=APP=204     |             LENGTH             |
+-+-+-+-+-+-+-+-+-+-+-+-+-+-+-+-+-+-+-+-+-+-+-+-+-+-+-+-+-+-+-+-+
|                SSRC OF TRANSMISSION CONTROL SERVER             |
+-+-+-+-+-+-+-+-+-+-+-+-+-+-+-+-+-+-+-+-+-+-+-+-+-+-+-+-+-+-+-+-+
|                        NAME = MCV1                             |
+-+-+-+-+-+-+-+-+-+-+-+-+-+-+-+-+-+-+-+-+-+-+-+-+-+-+-+-+-+-+-+-+
|                   RECORD STATUS INDICATOR FIELD               |
+-+-+-+-+-+-+-+-+-+-+-+-+-+-+-+-+-+-+-+-+-+-+-+-+-+-+-+-+-+-+-+-+
```

METHOD FOR SHARING A RECORDING STATUS INSIDE A MISSION CRITICAL VIDEO GROUP CALL

CROSS-REFERENCE TO RELATED APPLICATION(S)

This application is a continuation of U.S. application Ser. No. 18/020,795, which was filed in the U.S. Patent and Trademark Office on Feb. 10, 2023, issued as U.S. Pat. No. 12,052,304 on Jul. 30, 2024, issued as U.S. Pat. No. 12,052,304 on Jul. 30, 2024, which is a U.S. National Phase Entry of PCT International Application No. PCT/KR2021/010764, which was filed on Aug. 12, 2021, and claims priority to Indian Patent Application Nos. 202041034738 and 202041034738, which were filed in the Indian Intellectual Property Office on Aug. 12, 2020, and Aug. 4, 2021, respectively, the entire disclosure of each of which is incorporated herein by reference.

BACKGROUND

1. Field

The present disclosure, in general, relates to sharing a recording status of a video and in particular, relates to systems and methods for sharing the recording status of the video inside a Mission CriticalVideo (MCVideo) group call.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Traditionally, 3GPP defined Mission Critical Push-To-Talk (MCPTT) that enables first responder to communicate with their voice. 3GPP defined MCVideo that enables first responder to stream video Ex: live video streaming from a fire disaster area etc. 3GPP MCVideo specification defined system and procedure on how to initiate MCVideo group call and share video to other users in group. But procedures for sharing the Recording Status of a video stream part of the MCVideo Group Call are not defined and there is no way to identify if any user has recorded which can be pulled later using MCVideo PULL request.

Initially in 3GPP MCVideo Service, users were unable to share their "Recording Status" in group calls when recording the video stream received/transmitted as part of MCVideo Group Call. In 3GPP MCVideo Service, users can simultaneously participate in multiple MCVideo group calls. In each MCVideo Group call, multiple group members can transmit video resulting to each user receiving multiple video stream from server in same group call. Due to human viewing and device display limitations, User can opt to watch a couple of video and record one which are important to watch later.

This problem becomes inevitable as per 3GPP 22.279 Technical Specification for MCPTT Group Annexure "C" that demands requirements supporting 500,000 groups with minimum 2000 members in each group. It's important in MCVideo System to identify who have recorded a video stream of particular user in Group Call, which can be pulled in future for reference or any other investigation purpose.

Thus, there is a need for a solution that overcomes the above deficiencies.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In accordance with some example embodiments of the present subject matter, a method for sharing a recording status inside a Mission CriticalVideo (MCVideo) group call is disclosed. The method includes receiving, by a plurality of User Equipment (UE) participating in the MCVideo group call, a live video stream from a MCVideo server in the MCVideo group call. The method includes recording, by at least one UE amongst the plurality of UEs, the live video stream, received from the MCVideo server in the MCVideo group call. The method includes appending, by the at least one UE recording the live video stream, the recording status indicative of recording of the live video stream, to a transmission control message and communicating the transmission control message to the MCVideo server.

Furthermore, a method according to one embodiments of the present subject matter, the method further comprising transmitting, by the MCVideo server, a media record notification message to at least one other UE amongst the plurality of UEs participating in the MCVideo group call, indicating that the at least one UE is recording the live video stream in response to receiving the transmission control message.

Furthermore, a method according to one embodiments of the present subject matter, wherein one or more UEs amongst the plurality of UEs participating in the MCVideo group call record a live video and stream the live video to MCVideo server as the live video stream.

Furthermore, a method according to one embodiments of the present subject matter, wherein the transmission control message is a Record Media Status message comprising a Record Status Indicator (RSI) field appended as the recording status to indicate to the MCVideo server that the at least one UE is recording the live video stream in the MCVideo Group Call.

Furthermore, a method according to one embodiments of the present subject matter, wherein the RSI field comprises: an RSI field identification (ID) set with a unique binary value to distinguish from other Transmission control specific fields; an RSI length is a value indicating a sum of an RSI value field and a length in one or more octets of a Synchronization Source (SSRC) value item except padding; an RSI value is a binary value with each bit corresponding to the SSRC of the one or more UEs, wherein the binary value set to 0 indicates that a UE is not recording the live video stream and the binary value set to 1 indicates the UE is recording the live video stream; and one or more SSRC.

Furthermore, a method according to one embodiments of the present subject matter, wherein the media record notification message comprises: an SSRC associated with the MCVideo server; and A User ID field to carry an identity associated with the one or more UEs.

Furthermore, a method according to one embodiments of the present subject matter, wherein the media record notification message comprises: an SSRC associated with the MCVideo server; and A User ID field to carry an identity associated with the one or more UEs.

In accordance with some example embodiments of the present subject matter, a system, for sharing a recording status inside a Mission CriticalVideo (MCVideo) group call is disclosed. The system includes a plurality of User Equipment (UE) participating in the MCVideo group call configured to receive a live video stream from a MCVideo server in the MCVideo group call. The system includes at least one UE amongst the plurality of UEs configured to record the live video stream, received from the MCVideo server in the MCVideo group call. The at least one UE is further configured to append the recording status indicative of recording of the live video stream, to a transmission control message and communicating the transmission control message to the MCVideo server.

Furthermore, a method according to one embodiments of the present subject matter, the method further comprising the MCVideo server configured to transmit a media record notification message to at least one other UE amongst the plurality of UEs participating in the MCVideo group call, indicating that the at least one UE is recording the live video stream in response to receiving the transmission control message.

Furthermore, a method according to one embodiments of the present subject matter, wherein one or more UEs amongst the plurality of UEs participating in the MCVideo group call record a live video and stream the live video to MCVideo server as the live video stream.

Furthermore, a method according to one embodiments of the present subject matter, wherein the transmission control message is a Record Media Status message comprising a Record Status Indicator (RSI) field appended as the recording status to indicate to the MCVideo server that the at least one UE is recording the live video stream in the MCVideo Group Call.

Furthermore, a method according to one embodiments of the present subject matter, wherein the RSI field comprises: an RSI field identification (ID) set with a unique binary value to distinguish from other Transmission control specific fields; an RSI length is a value indicating a sum of an RSI value field and a length in one or more octets of a Synchronization Source (SSRC) value item except padding; an RSI value is a binary value with each bit corresponding to the SSRC of the one or more UEs, wherein the binary value set to 0 indicates that a UE is not recording the live video stream and the binary value set to 1 indicates the UE is recording the live video stream; and one or more SSRC.

Furthermore, a method according to one embodiments of the present subject matter, wherein the media record notification message comprises: an SSRC associated with the MCVideo server; and A User ID field to carry an identity associated with the one or more UEs.

Furthermore, a method according to one embodiments of the present subject matter, wherein at least one other User ID field is added by a transmission control server in response to receiving the Record Media Status from the one or more UEs, further wherein the one or more UEs is greater than one.

In accordance with some example embodiments of the present subject matter, a method performed by a user equipment (UE) in a wireless communication system, the method comprising: receiving a live video stream from a mission critical video (MCVideo) server in a MCVideo group call; recording the live video stream, received from the MCVideo server; including a recording status indicative of recording of the live video stream to a transmission control message, and transmitting the transmission control message to the MCVideo server.

In accordance with some example embodiments of the present subject matter, a method performed by a mission critical video (MCVideo) server in a wireless communication system, the method comprising: transmitting, to a plurality of user equipments (UEs) participating in a MCVideo group call, a live video stream, and receiving, from at least one UE among the plurality of UEs, a transmission control message including a recording status indicative of recording of the live video stream.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 3 illustrates a schematic block diagram depicting the one or more UE streaming a live video, in accordance with an embodiment of the present subject matter;

FIG. 7 illustrates a tabular representation depicting a record media status message for sharing a recording status inside a Mission CriticalVideo (MCVideo) group call, in accordance with an embodiment of the present subject matter;

FIG. 8 illustrates a tabular representation depicting a Record Status Indicator (RSI) field appended to a record media status message, in accordance with an embodiment of the present subject matter; and FIG. 9 illustrates a tabular representation depicting a media record notification message, in accordance with an embodiment of the present subject matter.

Figure 1:
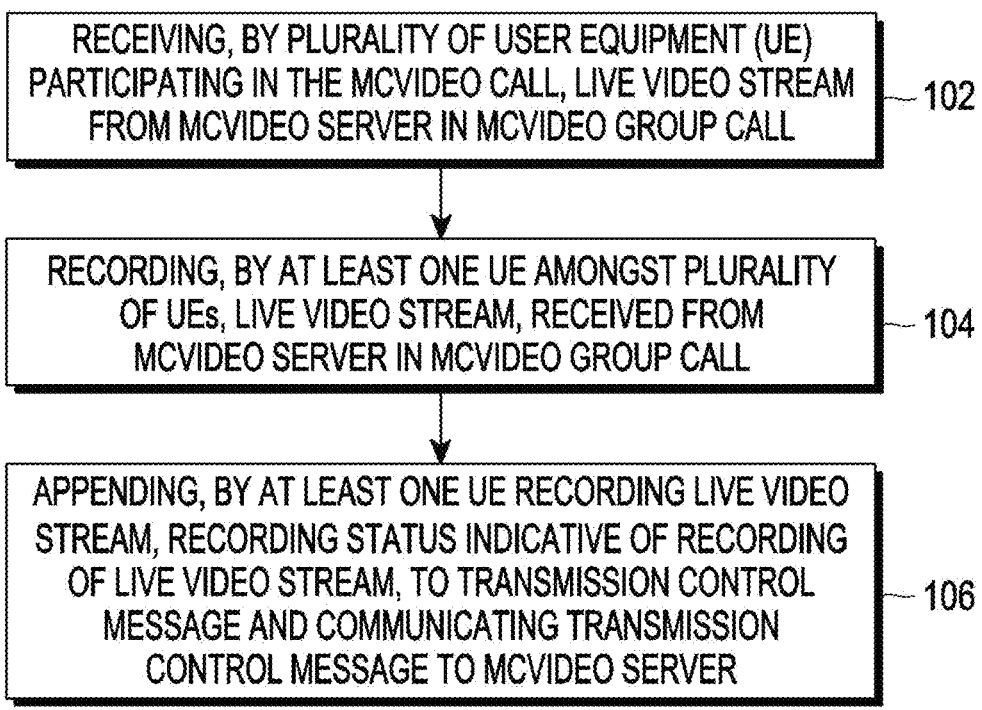
FIG. 1 illustrates a schematic block diagram depicting a method for sharing a recording status inside a Mission CriticalVideo (MCVideo) group call, in accordance with an embodiment of the present subject matter.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

For promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

FIG. 1 illustrates a schematic block diagram 100 depicting a method for sharing a recording status inside a Mission CriticalVideo (MCVideo) group call. In an embodiment, the recording status may be indicated by a Record Status Indicator (RSI) field appended as the recording status. In an embodiment, the recording status may be shared in a MCVideo private call. In an embodiment, the recording status may be shared in a 3GPP MCPTT call.

According to an embodiment of the present subject matter, the method includes receiving (step 102), by a plurality of User Equipment (UE) participating in the MCVideo group call, a live video stream from a MCVideo server in the MCVideo group call.

Continuing with the above embodiment, the method includes recording (step 104), by at least one UE amongst the plurality of UEs, the live video stream, received from the MCVideo server in the MCVideo group call.

Moving forward, the method includes appending (step 106), by the at least one UE recording the live video stream, the recording status indicative of recording of the live video stream, to a transmission control message and communicating the transmission control message to the MCVideo server.

Figure 2:
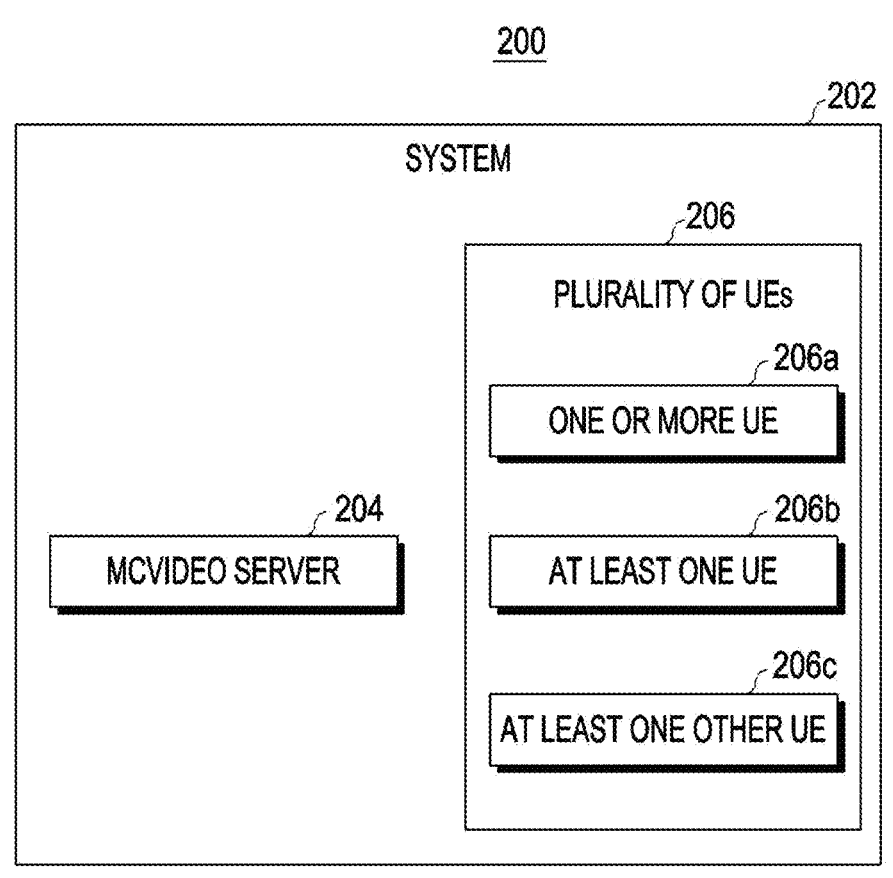
FIG. 2 illustrates a schematic block diagram of a system for sharing a recording status inside a Mission CriticalVideo (MCVideo) group call, in accordance with an embodiment of the present subject matter.

FIG. 2 illustrates a schematic block diagram 200 of a system 202 for sharing a recording status inside a Mission CriticalVideo (MCVideo) group call, in accordance with an embodiment of the present subject matter. In an embodiment, the system 202 may include a MCVideo server 204, a plurality of UEs 206 connected with one another in a MCVideo group call. Examples of the plurality of UE 206 may include, but are not limited to, a smartphone, a camera, and a video recorder. In an embodiment, the recording status may be related to a live video stream shared during the MCVideo group call between the plurality of UE 206 through the MCVideo server 204.

In an embodiment, the plurality of UE 206 may include one or more UE 206*a*, at least one UE 206, and at least one other UE 206*c*. Continuing with the above embodiment of the present subject matter, the one or more UE 206*a* amongst the plurality of UE 206 may be configured to record a live video from a location. Further, the one or more UE 206*a* may be configured to share the live video as the live video stream with the MCVideo server 204.

Subsequent to receiving the live video stream, the MCVideo server 204 may be configured to share the live video stream with the plurality of UE 206 participating in the MCVideo group call.

In continuation with the above embodiment, the at least one UE 206*b* amongst the plurality of UE 206 may be configured to record the live video stream. Furthermore, the at least one UE 206*b* may be configured to share the recording status with the MCVideo server 204. In an embodiment, the recording status may indicate that the live video stream shared in the MCVideo group call is recorded by the at least one UE 206*b* amongst the plurality of UE 206. In an embodiment, the recording status may be shared by appending the recording status to a transmission control message and communicating the transmission control message to the MCVideo server 204.

Furthermore, the MCVideo server 204 upon receiving the transmission control message appended with the recording status, may be configured to notify the at least one other UE 206*c* in the MCVideo group call that the live video stream is being recorded by the at least one UE 206*b*. In an embodiment, the MCVideo server 204 may be configured to transmit a media record notification message to the at least one other UE 206*c* participating in the MCVideo group call indicating that the at least one UE 206*b* is recording the live video stream in response to receiving the transmission control message.

Figure 3:
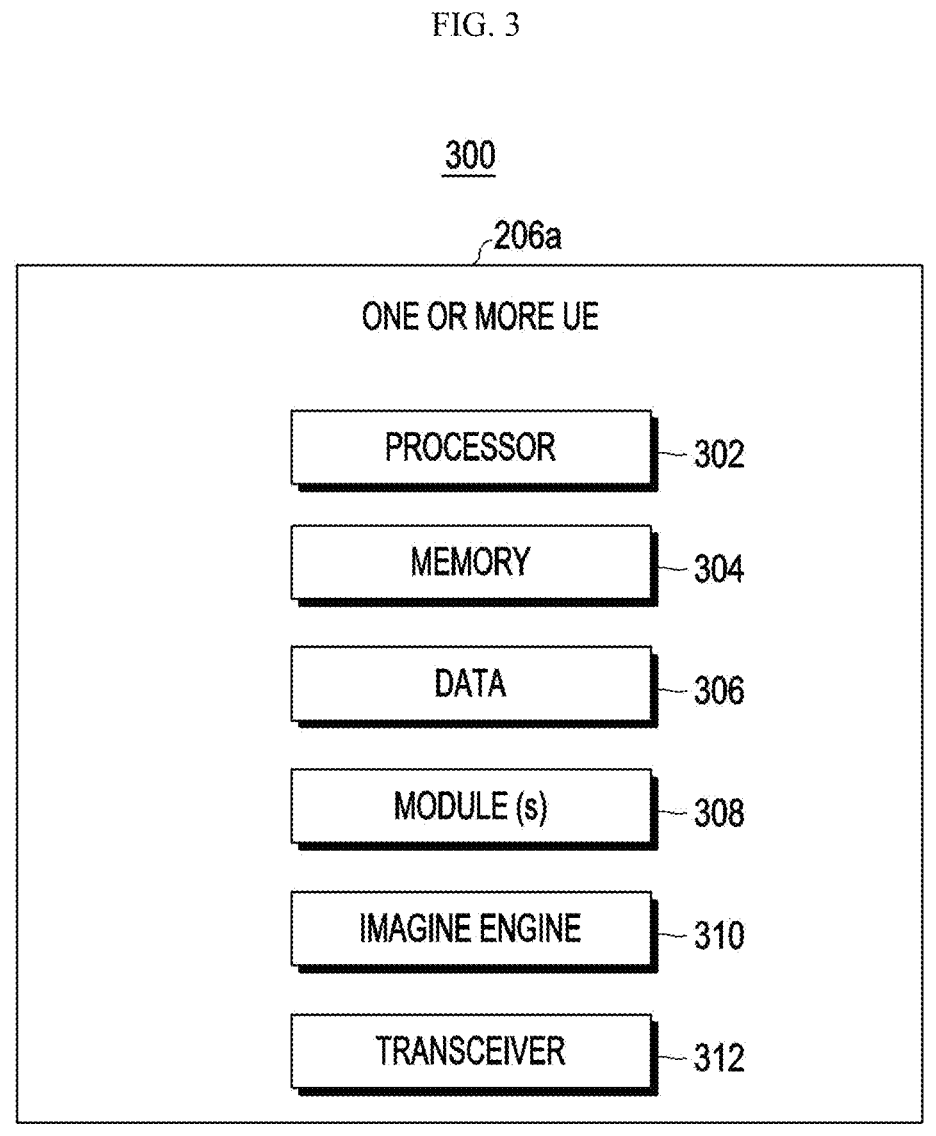

FIG. 3 illustrates a schematic block diagram 300 depicting the one or more UE 206*a* streaming a live video, in accordance with an embodiment of the present subject matter. In an embodiment, the one or more UE 206*a* may be amongst the number of UE 206 participating in a MCVideo group call. In an embodiment, the one or more UE 206*a* may be configured to record and stream the live video as a live video stream from a location to the MCVideo server 204 such that the MCVideo server 204 may share the live video steam with the number of UE 206 in the MCVideo group call.

Continuing with the above embodiment, the one or more UE 206*a* may include a processor 302, a memory 304, data 306, module(s) 308, an imaging unit 310, and a transceiver 312. In an embodiment, the processor 302, the memory 304, the data 306, the module(s) 308, the imaging unit 310, and the transceiver 312 may be communicably coupled to one another.

As would be appreciated, the one or more UE 206*a*, may be understood as one or more of a hardware, and a configurable hardware, and the like. In an example, the processor 302 may be a single processing unit or a number of units, all of which could include multiple computing units. The processor may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 302 may be configured to fetch and/or execute computer-readable instructions and/or data 306 stored in the memory 304.

In an example, the memory 304 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 304 may include the data 306.

The data 306 serves, amongst other things, as a repository for storing data processed, received, and generated by one or more of, the processor 302, the memory 304, the module(s) 308, the imaging unit 312, and the transceiver 314. In an embodiment, the data 306 may include the live video recorded by the one or more UE 206*a*.

The module(s) 308, amongst other things, may include routines, programs, objects, components, data structures, etc., which perform particular tasks or implement data types. The module(s) 308 may also be implemented as, signal processor(s), state machine(s), logic circuitries, and/or any other device or component that manipulate signals based on operational instructions.

Further, the module(s) 308 may be implemented in hardware, instructions executed by at least one processing unit, for e.g., processor 302, or by a combination thereof. The processing unit may be a general-purpose processor which executes instructions to cause the general-purpose processor to perform operations or, the processing unit may be dedicated to performing the required functions. In another aspect of the present disclosure, the module(s) 308 may be machine-readable instructions (software) which, when executed by a processor/processing unit, may perform any of the described functionalities.

In some example embodiments, the module(s) 308 may be machine-readable instructions (software) which, when executed by a processor/processing unit, perform any of the described functionalities.

Continuing with the above embodiment, the imaging unit 310 may be configured to record the live video at the location. In an embodiment, the location may be a remote location. In an embodiment, the imaging unit 310 may be configured to click at least one image at the location for sharing with the MCVideo server 204.

In continuation with the above embodiment, upon recording of the live video by the imaging unit 310, the transceiver 312 may be configured to transmit a transmission request to the MCVideo server 204. In an embodiment, the transmission request may be transmitted to request for a permission to share the live video with the MCVideo server 204.

Moving forward, the transceiver 312 may be configured to receive a transmission granted message from the MCVideo server 204. In an embodiment, the transmission granted message may be in response to transmitting the transmission request. In an embodiment, the transmission granted message may indicate that the one or more UE 206*a* is allowed to share the live video with the MCVideo server 104.

Continuing with the above embodiment, the transceiver 312 may be configured to transmit the live video as a live video stream to the MCVideo server 204 for sharing the live video stream in the MCVideo group call.

Figure 4:
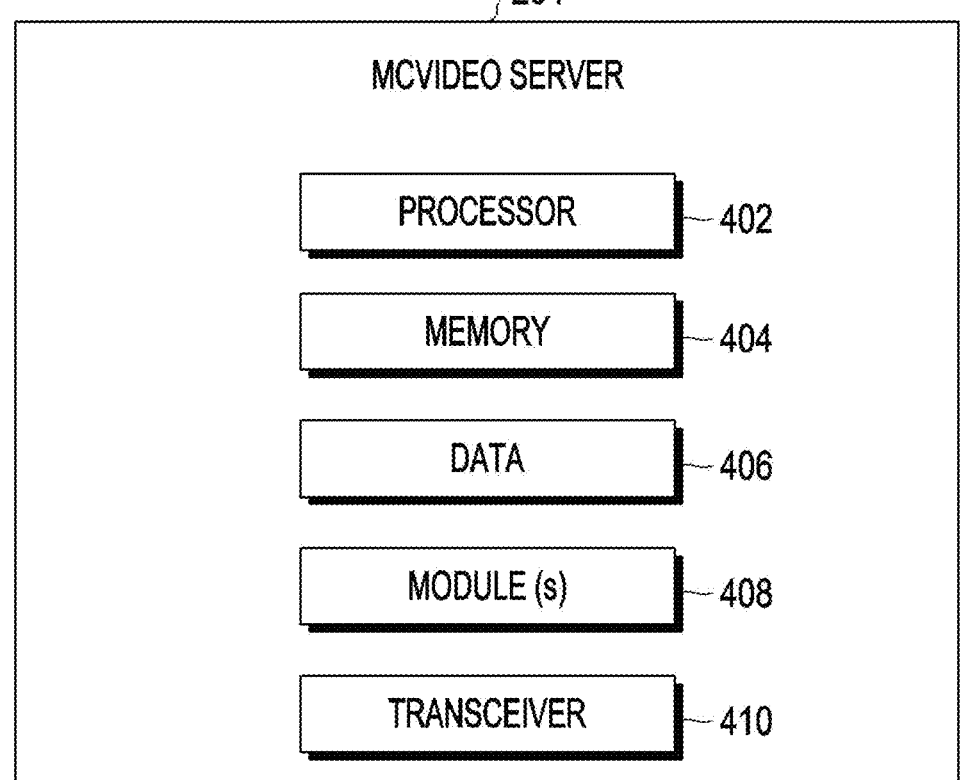
FIG. 4 illustrates a schematic block diagram depicting the MCVideo server, in accordance with an embodiment of the present subject matter.

FIG. 4 illustrates a schematic block diagram 400 depicting the MCVideo server 204, in accordance with an embodiment of the present subject matter. In an embodiment, the MCVideo server 214 may be communicating with the number of UE 206. In an embodiment, the MCVideo 204 may be hosting a MCVideo group call such that the number of UE 206 may communicate with one another. In an embodiment, the MCVideo server 204 may be configured to communicate with the number of UE 206 through one of wired communication standards and wireless communication standards. In an embodiment, the MCVideo server 204 may be configured to receive a live video stream from the one or more UE 106a. Furthermore, the MCVideo server 204 may be configured to share the live video stream with the number of UE 206 participating in the MCVideo group call.

Continuing with the above embodiment, the MCVideo server 204 may include a processor 402, a memory 404, data 406, module(s) 408, a transceiver 410. In an embodiment, the processor 402, the memory 404, the memory 406, the module(s) 408, and the transceiver 410 may be communicably coupled to one another.

As would be appreciated, the MCVideo server 204, may be understood as one or more of a hardware, a software, a logic-based program, a configurable hardware, and the like. In an example, the processor 402 may be a single processing unit or a number of units, all of which could include multiple computing units. The processor may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 402 may be configured to fetch and/or execute computer-readable instructions and/or data 406 stored in the memory 404.

In an example, the memory 404 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 404 may include the data 406.

The data 406 serves, amongst other things, as a repository for storing data processed, received, and generated by one or more of, the processor 402, the memory 404, the module(s) 408, the transceiver 410. In an embodiment, the data 406 may include the live video stream shared by the one or more UE 206a.

The module(s) 408, amongst other things, may include routines, programs, objects, components, data structures, etc., which perform particular tasks or implement data types. The module(s) 408 may also be implemented as, signal processor(s), state machine(s), logic circuitries, and/or any other device or component that manipulate signals based on operational instructions.

Further, the module(s) 408 may be implemented in hardware, instructions executed by at least one processing unit, for e.g., processor 402, or by a combination thereof. The processing unit may be a general-purpose processor which executes instructions to cause the general-purpose processor to perform operations or, the processing unit may be dedicated to performing the required functions. In another aspect of the present disclosure, the module(s) 408 may be machine-readable instructions (software) which, when executed by a processor/processing unit, may perform any of the described functionalities.

In some example embodiments, the module(s) 408 may be machine-readable instructions (software) which, when executed by a processor/processing unit, perform any of the described functionalities.

Continuing with the above embodiment, the transceiver 410 may be configured to receive a transmission request from the one or more UE 206a. Upon receiving the transmission request, the processor 402 may be configured to process the transmission request.

Moving forward, the processor 402 may be configured to generate a transmission granted message for allowing the one or more UE 206a to transmit the live video stream. Furthermore, the transceiver 410 may be configured to transmit the transmission granted message to the one or more UE 206a.

Furthermore, in response to transmitting the transmission granted message, the transceiver 410 may be configured to receive the live video stream from the one or more UE 206a. Upon receiving the live video stream, the transceiver 410 may be configured to share the live video stream with the number of UE 206 participating in the MCVideo group call.

In response to transmitting the live video stream to the number of UE 206, the transceiver 410 may be configured to receive a record media status message from the at least one UE 206b amongst the number of UE. In an embodiment, the record media status message may indicate that the at least one UE 206b is recording the live video stream shared in the MCVideo group call.

Moving forward, the processor 402 may be configured to process the record media status message. In response to processing the record media status message, the processor 402 may be configured to generate a media record notification message. In an embodiment, the media record notification message may indicate to the at least one other UE 206c that the at least one UE 206b is recording the live video stream. In an embodiment, the transceiver 410 may be configured to transmit the media record notification message to the at least one other UE 206c participating in the MCVideo group call.

Figure 5:
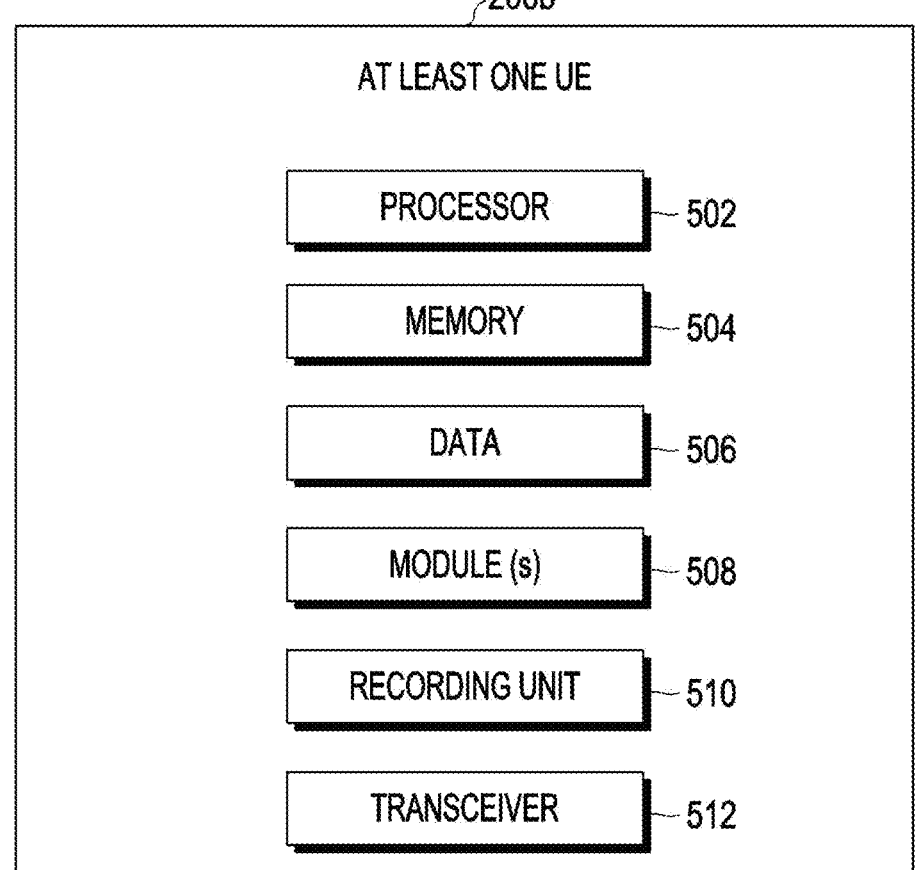
FIG. 5 illustrates a schematic block diagram depicting the at least one UE streaming a live video, in accordance with an embodiment of the present subject matter.

FIG. 5 illustrates a schematic block diagram 500 depicting the at least one UE 206b streaming a live video, in accordance with an embodiment of the present subject matter. In an embodiment, the at least one UE 206b may be amongst the number of UE 206 participating in a MCVideo group call. In an embodiment, the at least one UE 206b may be configured to receive a live video stream from the MCVideo server. Further, in response to receiving the live video stream, the at least one UE 206b may be configured to record the live video stream. To that understanding, the at least one UE 206b may be configured to notify the MCVideo server 204 that the live video stream is being recorded by the at least one UE 206b.

Continuing with the above embodiment, the at least one UE 206b may include a processor 502, a memory 504, data 506, module(s) 508, a recording unit 510, and a transceiver 512. In an embodiment, the processor 502, the memory 504, the data 506, the module(s) 508, the recording unit 510, and the transceiver 512 may be communicably coupled to one another.

As would be appreciated, the at least one UE 206b, may be understood as one or more of a hardware, and a configurable hardware, and the like. In an example, the processor 502 may be a single processing unit or a number of units, all of which could include multiple computing units. The processor may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 502 may be configured to fetch and/or execute computer-readable instructions and/or data 506 stored in the memory 504.

In an example, the memory 504 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 504 may include the data 506.

*83 The data 506 serves, amongst other things, as a repository for storing data processed, received, and generated by one or more of, the processor 502, the memory 504, the module(s) 508, the recording unit 510, and the transceiver 512. In an embodiment, the data 506 may include the live video stream shared by the MCVideo server 204.

The module(s) 508, amongst other things, may include routines, programs, objects, components, data structures, etc., which perform particular tasks or implement data types. The module(s) 508 may also be implemented as, signal processor(s), state machine(s), logic circuitries, and/or any other device or component that manipulate signals based on operational instructions.

Further, the module(s) 508 may be implemented in hardware, instructions executed by at least one processing unit, for e.g., processor 502, or by a combination thereof. The processing unit may be a general-purpose processor which executes instructions to cause the general-purpose processor to perform operations or, the processing unit may be dedicated to performing the required functions. In another aspect of the present disclosure, the module(s) 508 may be machine-readable instructions (software) which, when executed by a processor/processing unit, may perform any of the described functionalities.

In some example embodiments, the module(s) 508 may be machine-readable instructions (software) which, when executed by a processor/processing unit, perform any of the described functionalities.

Continuing with the above embodiment, the transceiver 512 may be configured to receive the live video stream from the MCVideo server 204. Upon receiving the live video stream, the recording unit 510 may be configured to record the live video stream. Furthermore, the processor 502 may be configured to generate a record media status message to be shared with the MCVideo server 204. In an embodiment, the record media status message may be a transmission control message. In an embodiment, the record media status message may indicate that the at least one UE 206b is recording the live video stream shared in the MCVideo group call. In an embodiment, the processor 502 may be configured to append a RSI field to media record status message for indicating that the at least one UE 206b is recording the live video stream.

Continuing with the above embodiment, the transceiver 512 may be configured to transmit the record media status message containing the RSI field to the MCVideo server 204.

Figure 6:
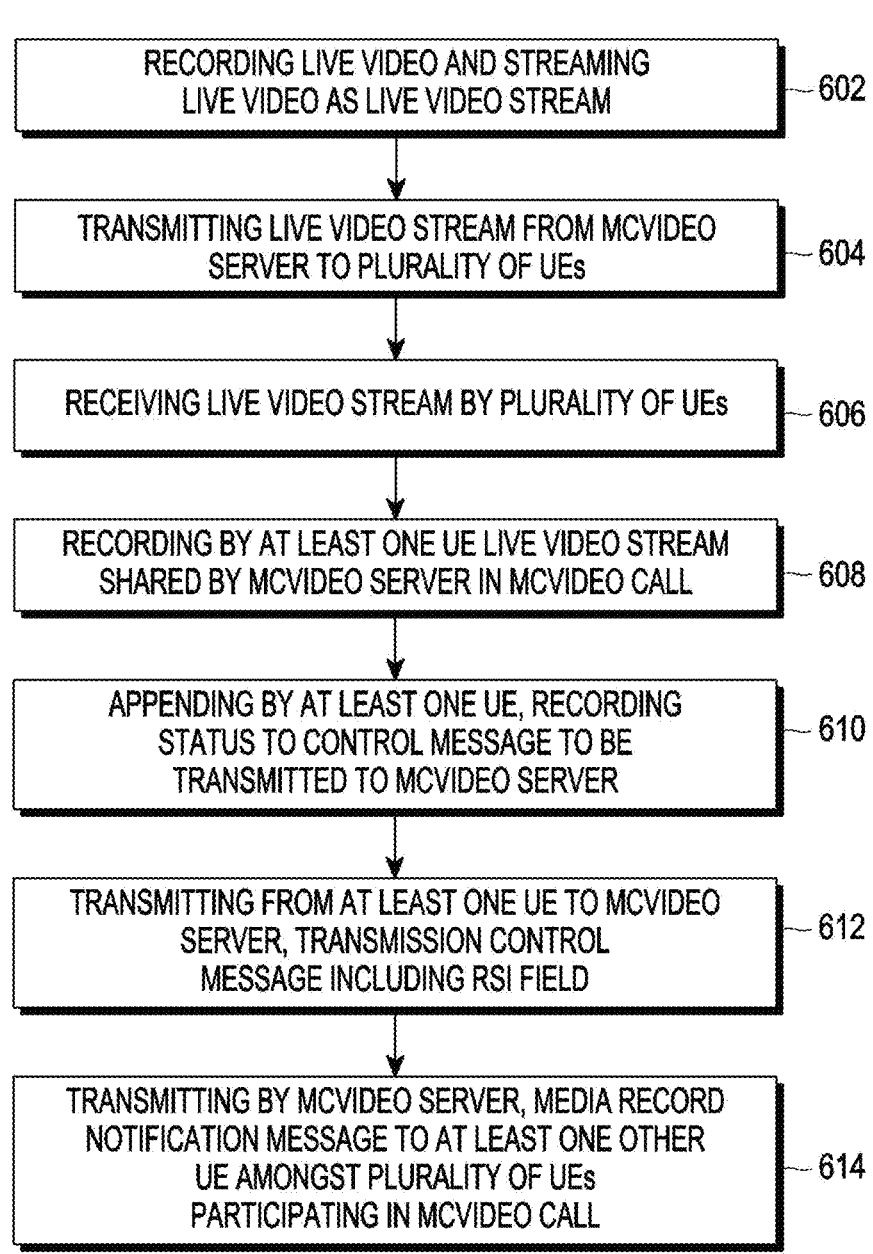
FIG. 6 illustrates an operational flow diagram depicting a process for sharing a recording status inside a Mission CriticalVideo (MCVideo) group call, in accordance with an embodiment of the present subject matter.

FIG. 6 illustrates an operational flow diagram 600 depicting a process for sharing a recording status inside a Mission CriticalVideo (MCVideo) group call, in accordance with an embodiment of the present subject matter. In an embodiment, the recording status may be related to recording of a live video stream shared by the one or more UE 206a with the at least one UE 206b and the at least one other UE 206 participating in a MCVideo group call through the MCVideo server 204. In an embodiment, the recording status may be shared in a MCVideo private call. In an embodiment, the recording status may be shared in a 3GPP Mission Critical Push-To-Talk (MCPTT) call.

Continuing with the above embodiment, the process may include recording (step 602) a live video from a location. In an embodiment, the location may be a remote location. In an embodiment, the live video may be recorded by one or more UE 206a amongst the plurality of UE 206. Further, the process may include streaming the live video as a live video stream to the MCVideo server 204. In an embodiment, the number of UE 206 and the MCVideo server 204 may be configured to communicate with one another through one of a wired communication standards and wireless communication standards. In an embodiment, prior to transmitting the live video stream, the process may include transmitting a transmission request from the one or more UE 206a to the MCVideo server 204. In an embodiment, the transmission request may be sent in order to receive a permission for transmitting the live video stream to the MCVideo server 204.

In an embodiment, the process may proceed towards, transmitting (step 604) the live video stream from the MCVideo server 204 to the plurality of UE 206 upon initiating a MCVideo group call participated by the plurality of UE 206. In an embodiment, the MCVideo server may be configured to receive the transmission request from the one or more UE 206a. Upon receiving the transmission request, the MCVideo server 204 may be configured to send a transmission granted message to the one or more UE 206a indicating an allowance for transmitting the live video stream.

In continuation with the above embodiment, the process may proceed towards receiving (step 606) the live video stream by the plurality of UE 206 participating in the group MCVideo group call.

Moving forward, the process may include recording (step 608) the live video stream shared by the MCVideo server 204 in the MCVideo group call. In an embodiment, the live video stream may be recorded by at least one UE 206b amongst the plurality of UE in the MCVideo group call.

Continuing with the above embodiment, the process may include appending (step 610) the recording status to a transmission control message to be transmitted to the MCVideo server 204. In an embodiment, the recording status may be appended by the at least one UE 206b to the transmission control message. In an embodiment, the recording status may indicate that the at least one UE 206b is recording the live video stream shared by the MCVideo group call.

In an embodiment, the transmission control message may be a Record Media status message including a Record Status Indicator (RSI) field appended as the recording status. In an embodiment, the RSI field may be the recording status appended to the transmission control message indicating that the live video stream shared in the MCVideo group call is being recorded.

In an embodiment, the RSI field may include an RSI field identification (ID), an RSI length, and an RSI value. In an embodiment, the RSI field ID may be set with a unique binary value to distinguish the RSI field from other transmission control specific fields. Furthermore, the RSI length may be a value indicating a sum of an RSI value field and a length in one or more octets of a Synchronization Source (SSRC) value item except padding. In an embodiment, the SSRC may be related to each of the plurality of UE participating and streaming the live video inside the MCVideo group call.

Moving forward, the RSI value may be a binary value with each bit corresponding to the SSRC of the one or more UE 206a sharing the live video as the live video stream with the MCVideo server 204. In an embodiment, the binary value set to 0 may indicate that a UE amongst the plurality of UE is not recording the live video stream. In an embodiment, the UE may be at least one other UE amongst the plurality of UE participating in the MCVideo group call. Furthermore, in an embodiment, the binary value related to the RSI value set to 1 may indicate that the UE is recording the live video stream. In an embodiment, the UE may be the at least one UE 206b recording the live video stream received from the MCVideo server 204.

Continuing with the above embodiment, the process may include transmitting (step 612) the transmission control message including the RSI field appended as the recording status from the at least one UE 206b to the MCVideo server 204.

Upon transmission of the recording status of the live video stream from the at least one UE 206b to the MCVideo server 204, the process may proceed towards transmitting (step 614) a Media Record Notification message to the at least one other UE amongst the plurality of UE participating in the MCVideo group call. In an embodiment, the media record notification message may be transmitted by the MCVideo server 204.

In an embodiment, the media record notification message may indicate to the at least one other UE that the at least one UE 206b is recording the live video stream. In an embodiment, the media record notification message may include the SSRC, a User ID field. In an embodiment, the SSRC may be related to the MCVideo server 204 such that the MCVideo server 204 is identified by the SSRC. Furthermore, the User ID filed may be configured to carry an identity associated with the one or more UE 206a. In an embodiment, where it is determined that the Record Media Status is received from the one or more UE 206a such that the one or more UE 206a is greater than one, at least one other User ID field is added by a transmission control server.

FIG. 7 illustrates a tabular representation 700 of a record media status message for sharing a recording status inside a Mission CriticalVideo (MCVideo) group call, in accordance with an embodiment of the present subject matter. In an embodiment, the record media status message may be a transmission control message. In an embodiment, the record status message may indicate that the at least one UE 206b as referred in the FIG. 2 is recording a live video stream shared in the MCVideo group call.

In an embodiment, a Record Status Indicator (RSI) field may be appended to the record media status message for indicating that the live video stream is being recorded. In an embodiment, the RSI field may be added by the at least one UE 206b such that the at least one UE 206B transmits the record status message to the MCVideo server 204. In an embodiment, the live video stream may be shared by the one or more UE 206a as referred in the FIG. 2 through the MCVideo server 204.

In an embodiment, the record status message may include an SSRC field, a name field, a User ID field, and the RSI field. In an embodiment, the SSRC field may include an SSRC related to the at least one UE 206b transmitting the record media status message. Moving forward, the name field may be set to "MCV0" indicating that a UE is transmitting the transmission control message to a server. In an embodiment, the UE may be the at least one UE 206b acting as a participant in the MCVideo group call and the server may be the MCVideo server 204.

Continuing with the above embodiment, the User ID field may be configured to carry an identity (ID) associated with the UE transmitting the transmission control messages. In an embodiment, the User ID field may carry an ID associated with the at least one UE 206b one or more UEs. In continuation with the above embodiment, the RSI field may include an RSI field identification (ID), an RSI length, an RSI value and one or more SSRC.

FIG. 8 illustrates a tabular representation 800 of a RSI field appended to a record media status message, in accordance with an embodiment of the present subject matter. In an embodiment, the RSI field may be appended by a UE to indicate that the UE is recording a live video stream shared amongst the plurality of UE 206 in a MCVideo group call through the MCVideo server 204 In an embodiment, the UE recording the live video stream may be the at least one UE 206b.

In an embodiment, the RSI field may be appended such that the MCVideo server 204 may notify other UE in the MCVideo group call that the live video stream is being recorded by the at least one UE 206b. In an embodiment, the other UE may be the at least one other UE 206c amongst the plurality of UE 206.

In an exemplary embodiment, the RSI field may be appended to other MCVideo Transmission Control Messages. In an embodiment, the other MCVideo transmission control message may be a "receive media request message". In an embodiment, the "receive media request message" may be shared by a user with the MCVideo server 204 indicating that the user may record the live video stream.

In an embodiment, the RSI field may include an RSI field ID, an RSI length, an RSI value and one or more SSRC. In an embodiment, the RSI field ID may be set with a unique binary value to distinguish the RSI field from other transmission control specific fields. Furthermore, the RSI length may be a value indicating a sum of an RSI value field and a length in one or more octets of the SSRC value.

In an embodiment, the RSI length may exclude a padding. Moving forward, the RSI value may be a binary value with each bit corresponding to the SSRC of the one or more UE 206c. In an embodiment, the binary value set to 0 may indicate that a UE is not recording the live video stream and the binary value set to 1 may indicate that the UE is recording the live video stream. In an embodiment, the UE recording the live video stream may be the at least one UE 206b as referred in the FIG. 2.

FIG. 9 illustrates a tabular representation 900 depicting a Media Record Notification (MRN) message, in accordance with an embodiment of the present subject matter. In an embodiment, the media record notification message may be transmitted by the MCVideo server as referred in the FIG. 2 to a UE amongst the plurality of UE 206 participating in a MCVideo group call. In an embodiment, the UE may be at least one other UE 206c in the MCVideo group call receiving a live video stream.

In an embodiment, the media record notification message may be transmitted to the at least one other UE 206c for indicating that another UE is recording the live video stream share by the one or more UE 206a in the MCVideo group call through the MCVideo server 204. In an embodiment, the media record notification message may be generated by the MCVideo server 204 upon receiving the record media status message from the at least one UE 206*b* indicating that the live video stream is being recorded by the at least one UE 206*b*.

In an embodiment, the media record notification message may include an SSRC, and a User ID field. In an embodiment, the SSRC may be associated with the MCVideo server 204. Furthermore, the User ID field may be configured to carry an identity associated with the one or more UEs 206*a*.

In an embodiment, where it is determined by the MCVideo server 204 that multiple UE are recording the live video stream upon receiving the record media status message from multiple UE amongst the number of UE 206, at least one other User ID field is added by a transmission control server. In an embodiment, the transmission control server may be the MCVideo server 204.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

What is claimed is:

1. A method performed by a user equipment (UE) in a wireless communication system, the method comprising:
 receiving, from a mission critical video (MCVideo) server, a live video stream in an MCVideo group call;
 recording the live video stream received from the MCVideo server;
 transmitting, to the MCVideo server, a transmission control message including a record media status message for indicating that the live video stream is being recorded while participating in the MCVideo group call, wherein the UE is at least one among a plurality of UEs participating in the MCVideo group call; and
 receiving, from the MCVideo server, a media record notification message indicating that at least one other UE participating in the MCVideo group call is recording the live video stream.

2. The method of claim 1, wherein the transmission control message further includes a record media status indication (RSI) field for notifying that the UE is recording the live video stream in the MCVideo group call.

3. The method of claim 2, wherein the RSI field includes at least one of:
 an RSI field identification (ID) set with a unique binary value to distinguish from other transmission control specific fields,
 an RSI length indicating a value related to an RSI value field,
 an RSI value indicating a binary value with each bit corresponding to a synchronization source (SSRC) of the UE, the binary value indicating whether the UE is recording the live video stream, or
 one or more SSRCs.

4. The method of claim 1, wherein at least one other user identification (ID) field is added to the media record notification message, by the MCVideo server, in response to receiving the record media status message from two or more UEs including the at least one other UE participating in the MCVideo group call.

5. The method of claim 1, wherein the UE among the plurality of UEs participating in the MCVideo group call is recording the live video stream received from the MCVideo server in the MCVideo group call, and
 wherein the UE also streams a live video of the UE to the MCVideo server.

6. The method of claim 1, wherein at least one other UE participating in the MCVideo group call is notified that the UE is recording the live video stream while participating in the MCVideo group call.

7. The method of claim 1, wherein the record media status message includes at least one of:
 a synchronization source (SSRC) associated with the MCVideo server, or
 a user identification (ID) field to carry an identity associated with at least one UE including the UE participating in the MCVideo group call.

8. A method performed by a mission critical video (MCVideo) server in a wireless communication system, the method comprising:
 transmitting, to a plurality of user equipments (UEs) participating in an MCVideo group call, a live video stream;
 receiving, from at least one UE among the plurality of UEs, a transmission control message including a record media status message for indicating that the live stream is being recorded while participating in the MCVideo group call; and
 transmitting, to at least one other UE among the plurality of UEs, a media record notification message indicating that the at least one UE is recording the live video stream.

9. The method of claim 8, wherein the transmission control message further includes a record media status indication (RSI) field for notifying that the at least one UE is recording the live video stream in the MCVideo group call.

10. The method of claim 9, wherein the RSI field includes at least one of:
 an RSI field identification (ID) set with a unique binary value to distinguish from other transmission control specific fields,
 an RSI length indicating a value related to an RSI value field,
 an RSI value indicating a binary value with each bit corresponding to a synchronization source (SSRC) of the at least one UE, the binary value indicating whether the at least one UE is recording the live video stream, or
 one or more SSRCs.

11. The method of claim 8, further comprising notifying at least one other UE participating in the MCVideo group call that the at least one UE is recording the live video stream while participating in the MCVideo group call.

12. The method of claim 8, wherein the record media status message includes at least one of:
 a synchronization source (SSRC) associated with the MCVideo server, or
 a user identification (ID) field to carry an identity associated with the at least one UE.

13. A user equipment (UE) in a wireless communication, the UE comprising:
 a transceiver; and
 at least one processor configured to:
 receive, from a mission critical video (MCVideo) server, a live video stream in an MCVideo group call, record the live video stream received from the MCVideo server, transmit, to the MCVideo server, a transmission control message including a record media status message for indicating that the live video stream is being recorded while participating in the MCVideo group call, wherein the UE is at least one among a plurality of UEs participating in the MCVideo group call, and receive, from the MCVideo server, a media record notification message indicating that at least one other UE participating in the MCVideo group call is recording the live video stream.

14. The UE of claim 13, wherein the transmission control message further includes a record media status indication (RSI) field for notifying that the UE is recording the live video stream in the MCVideo group call, and wherein the RSI field comprises at least one of:

an RSI field identification (ID) set with a unique binary value to distinguish from other transmission control specific fields, an RSI length indicating a value related to an RSI value field, an RSI value indicating a binary value with each bit corresponding to a synchronization source (SSRC) of the UE, the binary value indicating whether the UE is recording the live video stream, or one or more SSRCs.

15. The UE of claim 13, wherein the UE among the plurality of UE in the MCVideo group call is recording the live video stream received from the MCVideo server in the MCVideo group call, and wherein the UE also streams a live video of the UE to the MCVideo server.

16. A mission critical video (MCVideo) server in a wireless communication, the MCVideo server comprising:

a transceiver; and at least one processor configured to:

transmit, to a plurality of user equipments (UEs) participating in an MCVideo group call, a live video stream, receive, from at least one UE among the plurality of UEs, a transmission control message including a record media status message for indicating that the live stream is being recorded while participating in the MCVideo group call, and transmit, to at least one other UE among the plurality of UEs, a media record notification message indicating that the at least one UE is recording the live video stream.

17. The MCVideo server of claim 16, wherein the transmission control message includes a record media status indication (RSI) field for notifying that the at least one UE is recording the live video stream in the MCVideo group call, and wherein the RSI field comprises at least one of:

an RSI field identification (ID) set with a unique binary value to distinguish from other transmission control specific fields, an RSI length indicating a value related to an RSI value field, an RSI value indicating a binary value with each bit corresponding to a synchronization source (SSRC) of the at least one UE, the binary value indicating whether the at least one UE is recording the live video stream, or one or more SSRCs.

18. The MCVideo server of claim 16, wherein the at least one processor is further configured to notify at least one other UE participating in the MCVideo group call that the at least one UE is recording the live video stream while participating in the MCVideo group call.

\* \* \* \* \*